(No Model.)
E. TOPI.
HARDENING AND COLORING ALABASTER TILES.
No. 452,295. Patented May 12, 1891.
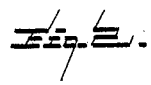
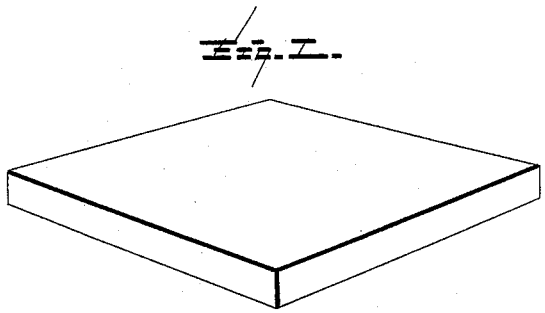
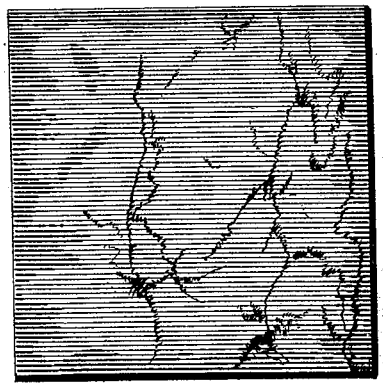
Witnesses
L. C. Hills.
H. Sutherland.
Inventor
Ettore Topi,
Curtis & Burdett
Attorneys

UNITED STATES PATENT OFFICE.

ETTORE TOPI, OF DENVER, COLORADO, ASSIGNOR, BY DIRECT AND MESNE ASSIGNMENTS, OF THREE-FOURTHS TO A. N. THOMPSON AND A. M. HEWITT, OF SAME PLACE.

HARDENING AND COLORING ALABASTER TILES.

SPECIFICATION forming part of Letters Patent No. 452,295, dated May 12, 1891.

Application filed September 12, 1890. Serial No. 364,714. (No model.)

*To all whom it may concern:*

Be it known that I, ETTORE TOPI, a citizen of the United States, residing at Denver, in the county of Arapahoe, State of Colorado, have invented certain new and useful Improvements in Tiles and Methods of Making Same, of which the following is a specification, reference being had therein to the accompanying drawings.

This invention has for its object the production of an alabaster tile impregnated with a suitable dye and having its surface preferably polished. By alabaster I mean the alabaster rock indigenous to the mountains of Colorado; but I do not intend to limit myself to this particular rock, my invention being of such scope as to include alabaster or other white rock of such a construction as will absorb throughout its entire texture a suitable dye. I aim at the production of a tile which shall be so saturated or impregnated with the dye that as the surface wears away the appearance of the tile shall not be changed.

The novelty in the present instance resides in the method of producing the tile as well as in the tile itself.

In the accompanying drawings, which form a part of this specification, I have shown in Figure 1 a perspective view of a plain uncolored tile, and in Fig. 2 a plan view of a colored tile.

In carrying out my invention I first prepare the blocks of alabaster or other white rock in any suitable manner, as by sawing, into the requisite size and shape, and smooth them all over the surface. The blocks are then subjected to the action of heat—for instance, by being placed in a hot oven—in order to expel all the moisture which is normally contained in the stone. The blocks are then removed from the oven and are allowed to cool off. They are then solid blocks of anhydrous sulphate of lime. After being cooled the blocks are soaked in the coloring-matter four or five times, or more if required, and then put aside for a sufficient length of time—say two or three hours, more or less—in order to give the coloring-matter time to impregnate or penetrate and get dry. After this time has elapsed the blocks are immersed in water, where they are left for at least twenty-four hours. When taken from the water, the blocks are very much harder than in their original state, owing to the action of the water upon the anhydrous sulphate of lime and the coloring-matter filling the pores of the stone.

Different colors and shades may be given to the blocks. White is the natural color and does not need to go through any coloring-matter, simply immersed in the water to harden it. For red I generally use cochineal, madder, redwood, and alum. Yellow is made of fustic, saffron, and alum. Blue is made of logwood and alum. Another kind of dark blue is made out of logwood, nut-gall, and sulphate of iron and alum. Logwood and sulphate of iron make an excellent imitation of gray marble. Other shades of color can be obtained according to the more or less density of the coloring-matter.

The blocks are susceptible of a high polish. In order to polish them, I usually take a suitable rubbing device, as a bunch of rush-grass, and soak it in water and go all over the surface until it is very smooth. For polishing-matter I take a suitable calcareous substance, as the knee-bone of an ox, cow, or calf, and calcine it and then grind it very fine. The dust is then mixed with rain-water and soap in suitable proportions and this paste ground until it is very fine and free of grit. Then by applying this paste on a piece of cloth and rubbing it over the stone as above prepared it will take a very high polish in a short time. I then warm the blocks at a moderate heat and apply thereto an unctuous substance (spermaceti I have found to be best suited to the purpose) in a melted state. The blocks are then allowed to cool off, after which they are rubbed off to remove all trace of the unctuous substance.

Alabaster blocks prepared in this manner may be used for tiling, mantels, balusters, stair-railings, and for many other inside ornamental purposes, and have proved very durable. The blocks being impregnated with the coloring-matter, as the surface becomes worn the appearance of the block is not changed. After the polish is worn off they may be repolished, if desired.

What I claim as new is—

1. As an improved article of manufacture, a tile of alabaster hardened, impregnated with a suitable dye, and having its surface polished, substantially as specified.

2. The herein-described method of making alabaster tiles, which consists in removing the moisture from the alabaster, then subjecting the same to the action of water to harden it, and then polishing the alabaster, as set forth.

3. The herein-described method of making alabaster tiles, which consists in removing the moisture from the alabaster, then soaking the same in a suitable coloring-matter, then immersing the alabaster in water, next applying a paste and an unctuous substance, and rubbing the same, substantially as specified.

4. The herein-described method of making alabaster tiles, which consists in removing the moisture, soaking in coloring-matter, drying, subjecting to the action of water, applying a paste, rubbing, applying at a moderate heat an unctuous substance, cooling, and then rubbing, as set forth.

In testimony whereof I affix my signature in presence of two witnesses.

ETTORE TOPI.

Witnesses:
 FRED THOMPSON,
 W. B. HEWITT.